United States Patent
Milam et al.

(10) Patent No.: US 8,408,485 B2
(45) Date of Patent: Apr. 2, 2013

(54) SKID STEER MIXER ATTACHMENT

(76) Inventors: Mark A. Milam, Roann, IN (US); Max D. Meyer, North Manchester, IN (US); Austin M. Carrothers, Wabash, IN (US); Robert L. Haecker, North Manchester, IN (US)

( * ) Notice: Subject to any disclaimer, the term of this patent is extended or adjusted under 35 U.S.C. 154(b) by 121 days.

(21) Appl. No.: 12/868,981

(22) Filed: Aug. 26, 2010

(65) Prior Publication Data

US 2011/0062261 A1  Mar. 17, 2011

Related U.S. Application Data

(60) Provisional application No. 61/241,443, filed on Sep. 11, 2009.

(51) Int. Cl.
 *B02C 19/22* (2006.01)
(52) U.S. Cl. ............... 241/101.77; 241/260.1; 366/319; 366/603
(58) Field of Classification Search ........... 241/101.742, 241/101.77, 605; 366/314, 319, 603
See application file for complete search history.

(56) References Cited

U.S. PATENT DOCUMENTS

| 4,923,128 A | * | 5/1990 | Ostrowski | ............. 241/101.742 |
| 2010/0032508 A1 | * | 2/2010 | Post et al. | ................... 241/88.4 |

FOREIGN PATENT DOCUMENTS

EP  0061666  * 6/1982

OTHER PUBLICATIONS

Patz Corporation; Patz Model 400 TMR Stationary Single Screw Vertical Mixers—Overview; undated; (2 pages).
Kuhn North America, Inc.; VT Vertical MAXX® Twin-Auger TMR Mixers 800-1100 Cubic Feet; undated; (3 pages).

* cited by examiner

*Primary Examiner* — Mark Rosenbaum
(74) *Attorney, Agent, or Firm* — Barnes & Thornburg LLP

(57) ABSTRACT

A mixer attachment for use with a skid steer. In one embodiment, the mixer attachment includes a mixing tub with a circumferential wall extending between a floor and a rim to define an interior compartment for holding a quantity of material. An auger may be provided that mixes the materials and is driven by a hydraulic drive unit. In some embodiments, one or more material retarders extend into the interior compartment to impede movement of the material within the interior compartment. A discharge chute allows discharge of material from the interior compartment. The mixing tub is movable between a scooping position and a mixing position.

16 Claims, 12 Drawing Sheets

SKID STEER MIXER ATTACHMENT

RELATED APPLICATION

This application claims the benefit of U.S. Provisional Patent Application Ser. No. 61/241,443, filed on Sep. 11, 2009, entitled "Skid Steer Mixer Attachment," the entire disclosure of which is hereby incorporated by reference.

TECHNICAL FIELD

This invention generally relates to attachments for skid steers; in particular, the invention relates to mixer attachment for a skid steer.

BACKGROUND

Mixing feed for cattle is necessary to completely blend raw feed materials for proper nutritional values. A completely blended feed will help cattle obtain the maximum rate of muscle gain per day, reducing days fed to market weight.

Mixing feed requires a combination transport/power unit (tractor/truck) to blend raw feed materials by hydraulics or power take off and transport the blend from raw feed material storage areas to feeding areas for cattle. Material handling equipment (skid loader, tractor loader, pay loader) is also needed to load mixing equipment attached to the transportation equipment.

Present day mixers are too large and expensive for cattle feeding operations managing smaller herd sizes, such as 5 to 50 head of cattle. They also require more than one motorized piece of equipment to complete the mixing and transport process.

SUMMARY

According to one aspect, the invention provides a mixer attachment for use with a skid steer. In one embodiment, the mixer attachment includes a mixing tub with a circumferential wall extending between a floor and a rim to define an interior compartment for holding a quantity of material. Typically, at least a portion of the circumferential wall has a flat portion extending substantially between the floor to the rim. An auger may be provided that extends into the interior compartment through the floor. In some cases, the auger includes one or more knives for cutting the material in the interior compartment. The mixer attachment may include a hydraulic drive unit configured to rotate the auger that is connectable to one or more hydraulic connections on the skid steer. An attachment assembly may be provided that is configured to attach the mixing tub to the skid steer. In some embodiments, one or more material retarders extend into the interior compartment to impede movement of the material within the interior compartment. A discharge chute allows discharge of material from the interior compartment. The mixing tub is movable between a scooping position and a mixing position. In the scooping position, the mixing tub is in a generally horizontal position such that a leading edge of the flat portion is a scooping surface for directing material into the interior compartment of the mixing tub. In the mixing position, the mixing tub is generally vertical such that rotation of the auger mixes material in the interior compartment of the mixing tub. Embodiments are contemplated in which a cutter edge adjacent the leading edge of the flat portion may be provided that aids in directing material into the mixing tub. Some embodiments may include wear strips on which the mixing tub substantially rides when in the scooping position. In some cases, the material retarders are movable between a first position (more impeding for material) and a second position (less impeding for material). Embodiments are contemplated in which the auger is centrally located in the floor. For example, the auger could be approximately concentric with the circumferential wall.

According to another aspect, the invention provides a mixer attachment for use with a skid steer. The mixer attachment includes a mixing tub with an interior compartment for holding a quantity of material. An auger may be included in the interior compartment for mixing the material. The mixer attachment includes a hydraulic drive unit configured to rotate the auger. A discharge chute may be provided for discharging material from the mixing tub. The mixing tub is movable between a scooping position in which at least a portion of the mixing tub is adapted to scoop material into the interior compartment from a pile of material on a surface and a mixing position in which rotation of the auger mixes the scooped material in the interior compartment. In some cases, the discharge chute is disposed on a circumferential wall of the mixing tub. For example, the discharge chute could be positioned on the circumferential wall to allow gravity feed of the material from the interior compartment when the auger rotates. In some embodiments, the auger includes a helical blade. Embodiments are contemplated in which one or more fodder knives extend from the helical blade to cut the material.

Additional features and advantages of the invention will become apparent to those skilled in the art upon consideration of the following detailed descriptions exemplifying the best mode of carrying out the invention as presently perceived.

BRIEF DESCRIPTION OF DRAWINGS

The present disclosure will be described hereafter with reference to the attached drawings which are given as non-limiting examples only, in which.

Figure 1A:
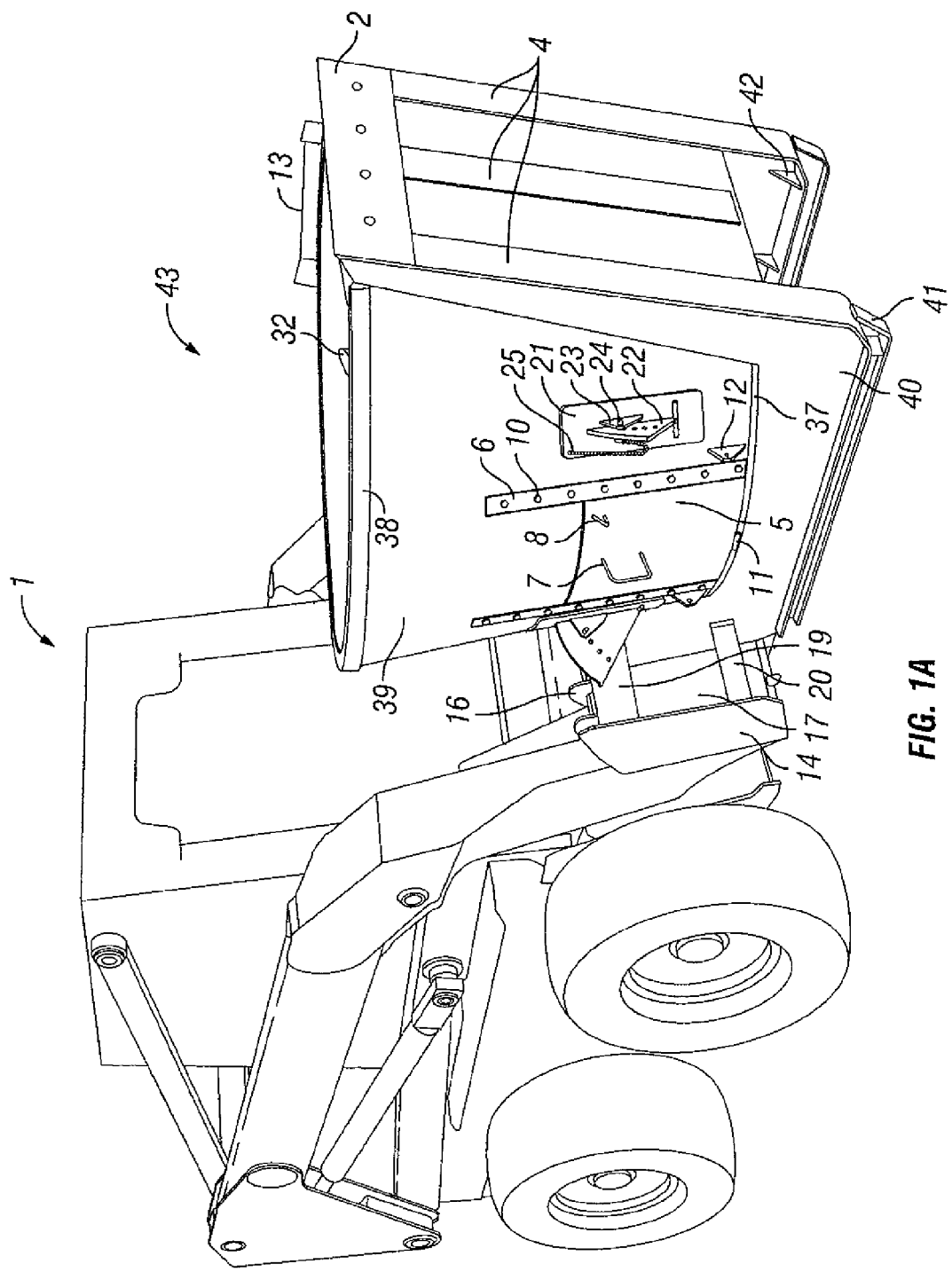
FIG. 1A is a right side perspective view of an example mixer attachment according to an embodiment of the invention with the mixer attached to a skid steer in a vertical position.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 1B:
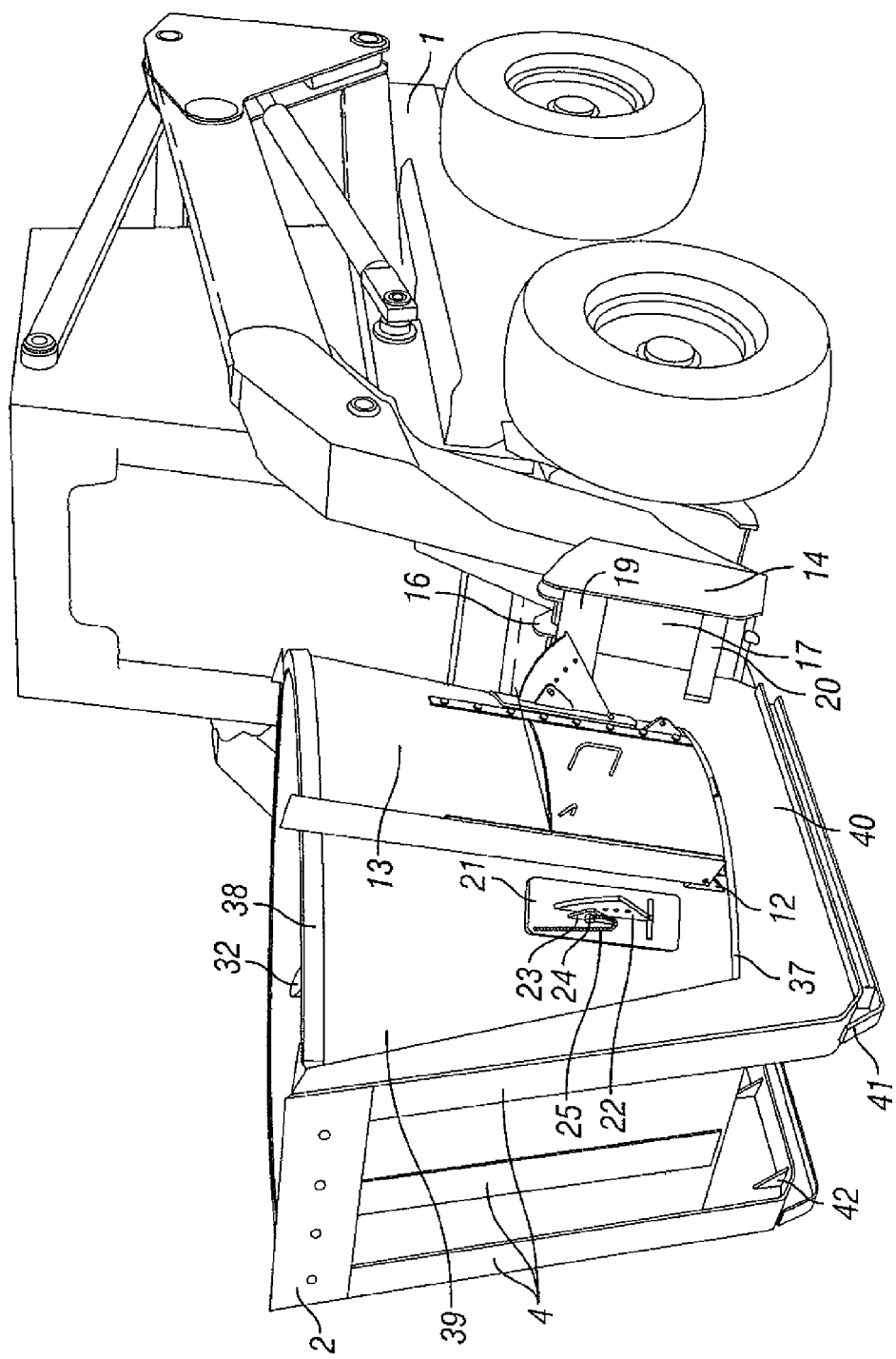
FIG. 1B is a left side perspective view of the example mixer attachment shown in FIG. 1.
Figure 2:
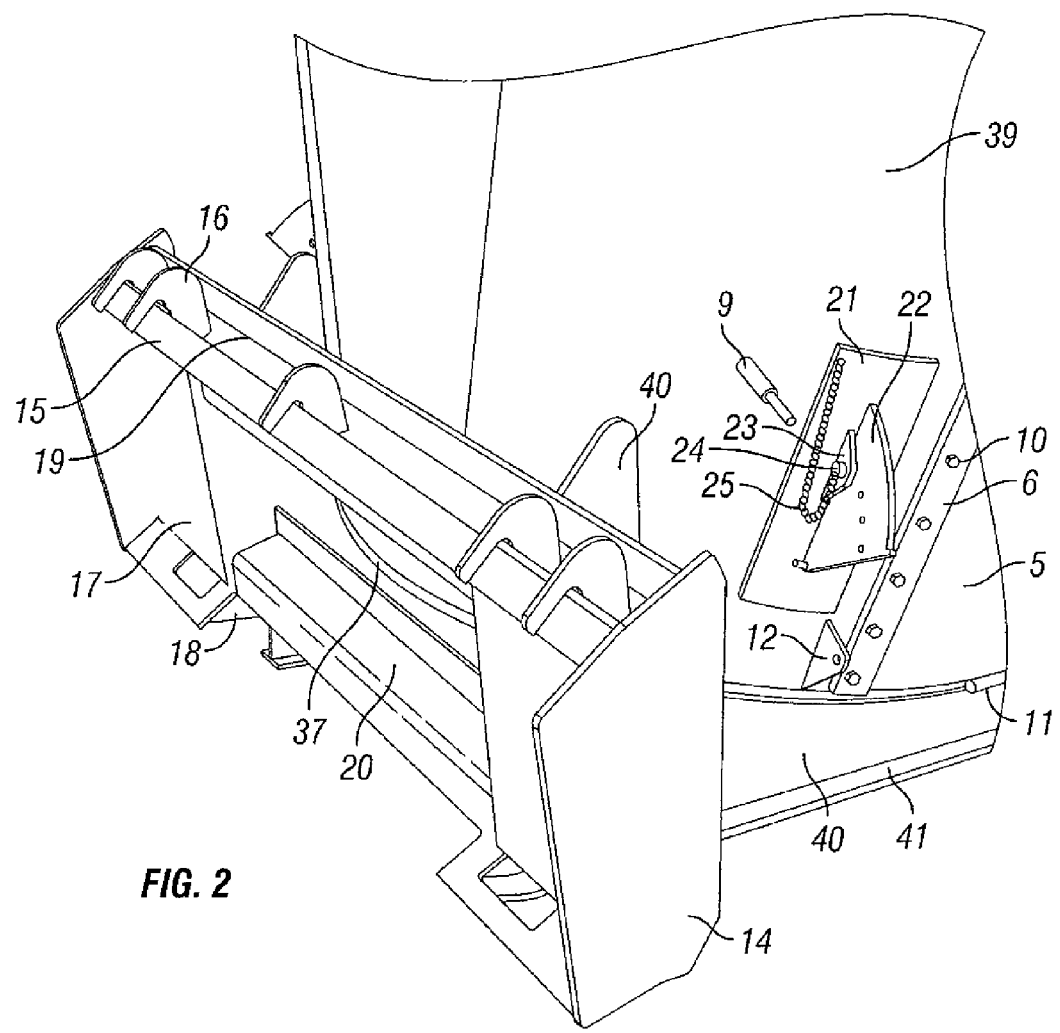
FIG. 2 is a detailed perspective view of the mounting plate.

Referring now to FIGS. 1A and 1B, there is shown a skid steer I attached to a mixer attachment 43. The mixer attachment 43 attaches to the skid loader 1 to transport raw feed materials from raw feed storage areas to feeding areas. When collecting raw feed materials, the skid loader utilizes its mobility and hydraulic functions to rotate the mixer attachment 43 to scoop materials over the cutter edge 2 sliding on the ware plates 4 until a desired quantity is obtained. At this point, the skid loader 1, with use of hydraulics, rotates the mixer attachment 43 to its vertical position as shown in FIG. 1A. Upon collection of all raw feed materials, the mixer attachment 43 is placed in the vertical position as shown in FIG. 2. Hydraulic fluid is supplied by the skid loader 1 through auxiliary hydraulic connectors through hydraulic hoses 28 on the mixer attachment 43 attached to the hydraulic drive unit 29, as shown in FIG. 6, secured with the auger shaft 26 retaining fastener described in FIG. 7.

As shown in FIG. 2, the skid loader quick attach system slides under the upper quick attach retaining bar 15, which is supported by multiple upper quick attach retaining bar support gussets 16. The skid loader 1 quick attach system then rotates to rest flush against quick attach alignment plate 17 centered between quick attach end brackets 14 locked into place by the skid loader 1. Locking pins extend through the quick attach alignment plate 17 with lock pin slot to secure the mixer attachment 43 to the skid loader 1. When the mixer attachment 43 is connected to the skid loader 1, it is supported by the mixer attachment 43, quick attach top support 19, and quick attach bottom support 20 secured to the tub support frame 46. The tub support frame 40 attaches to the mixing tub 39 and mixing tub floor.

Figure 3:
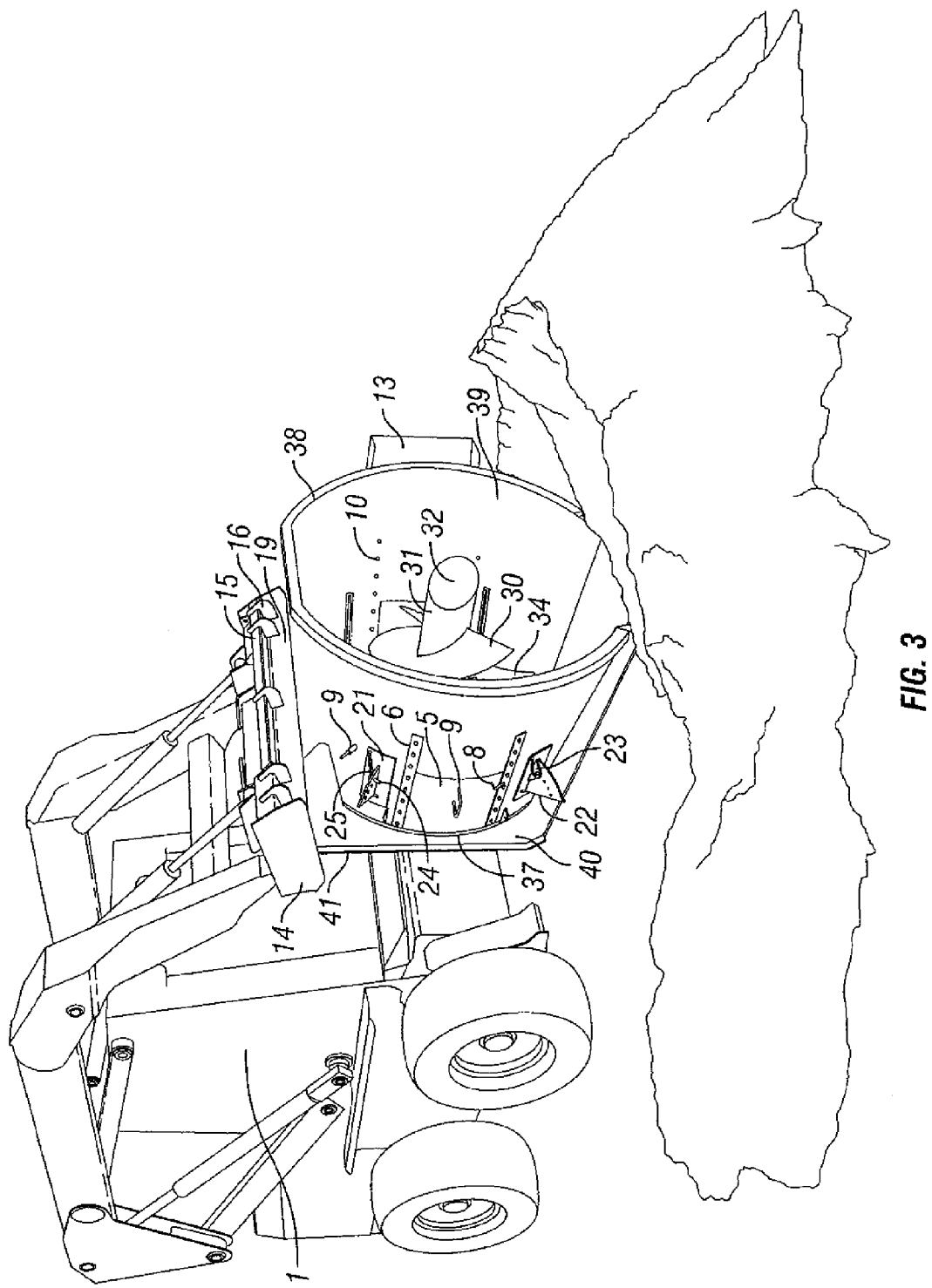
FIG. 3 is a right side view of the example mixer attachment shown in FIG. 1A in horizontal position scooping up some material into the mixer.
Figure 4A:
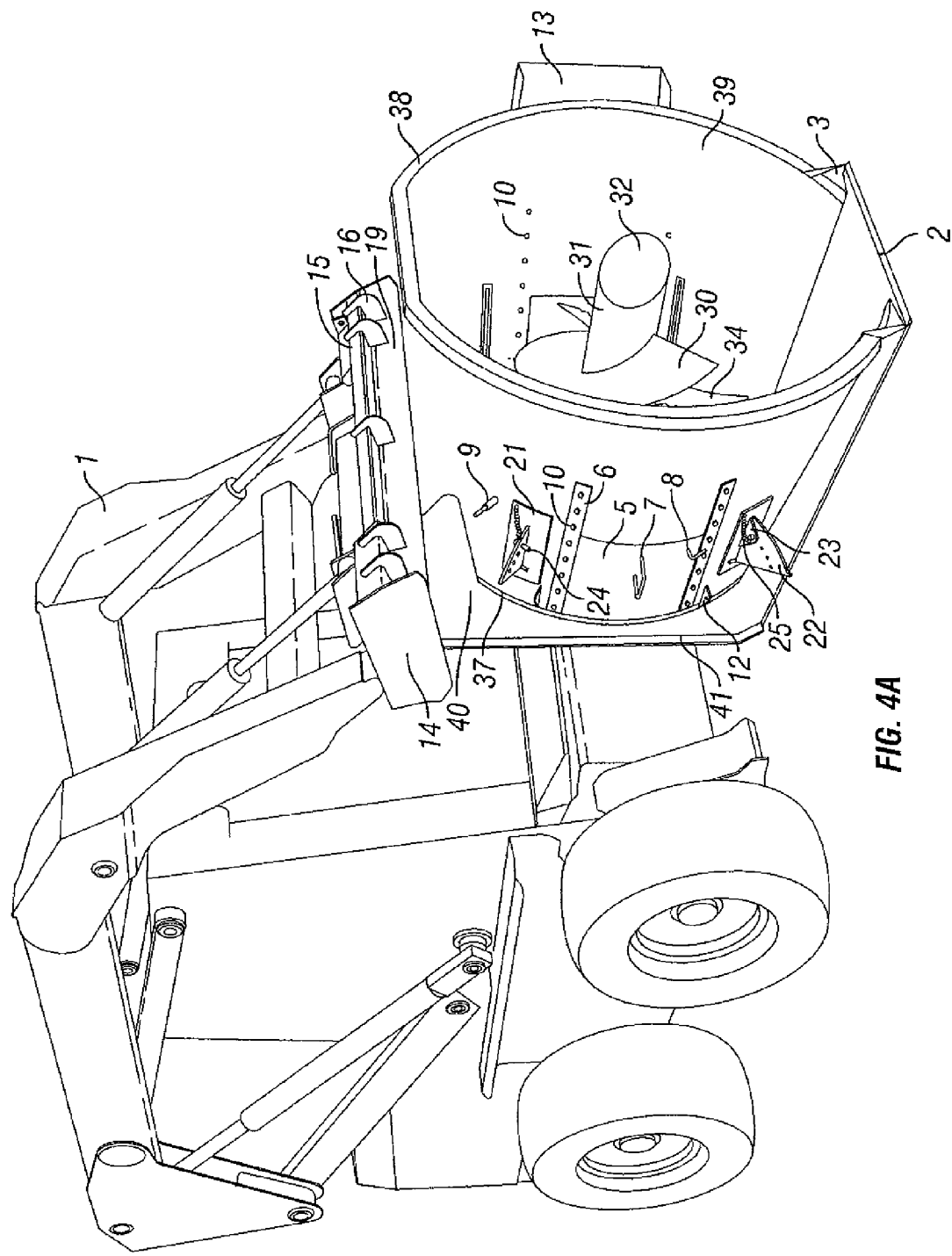
FIG. 4A is a right side perspective view of the example mixer attachment shown in FIG. 1A with the mixer in a horizontal position.
Figure 4B:
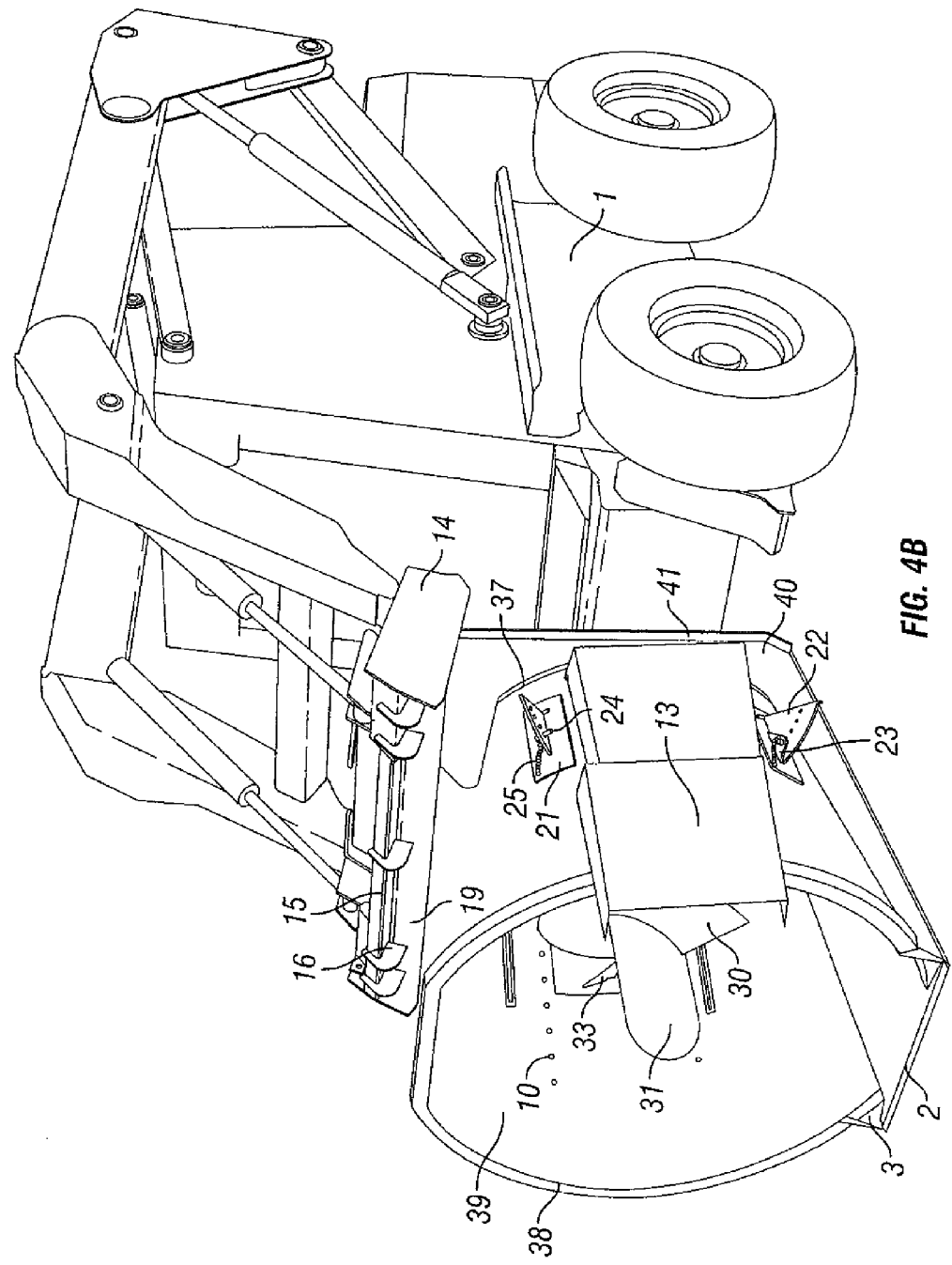
FIG. 4B is a left side perspective view of example mixer attachment shown in FIG. 1B with the mixer in a horizontal position.
Figure 5:
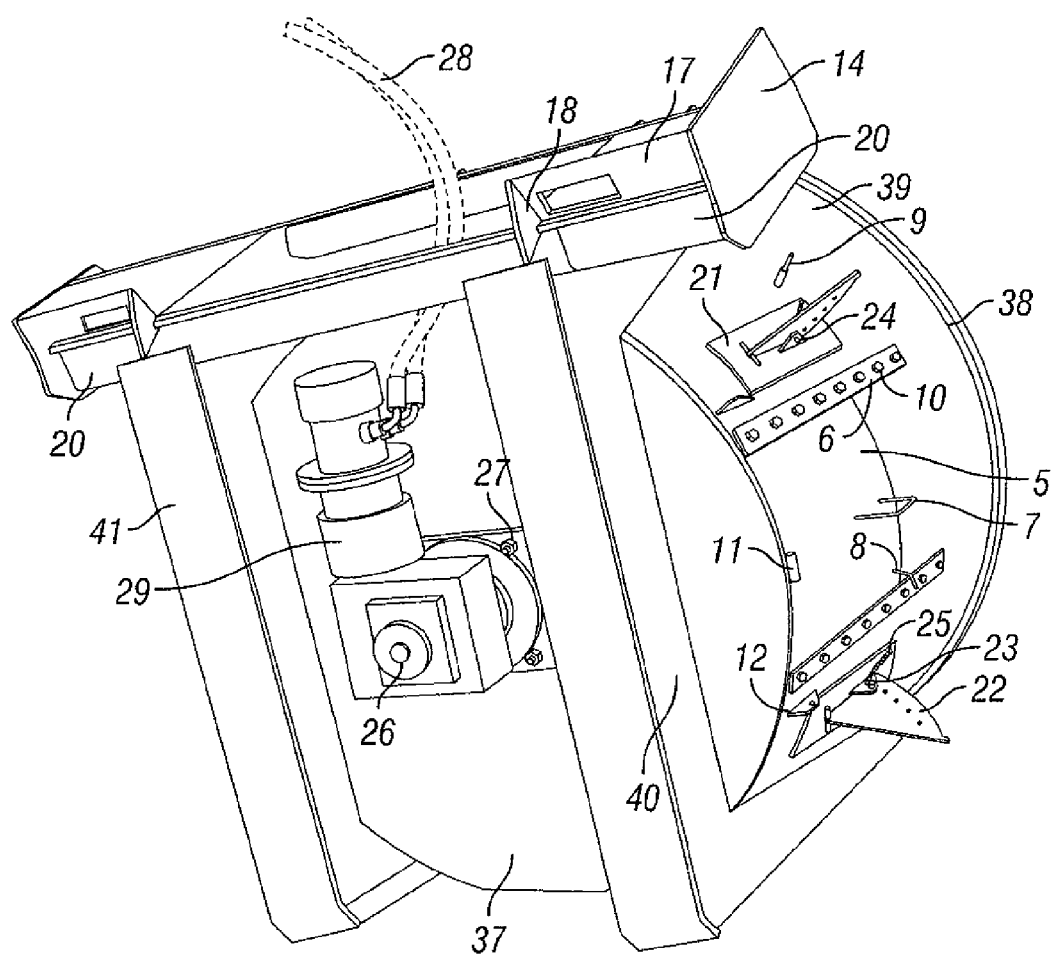
FIG. 5 is a bottom perspective view of the example mixer attachment shown in FIG. 1A.

In FIGS. 3, 4A and 4B skid loader 1 and mixer attachment 43 in combination can be used to combine, transport and deliver raw feed materials from storage areas to feeding areas. The skid loader 1 utilizes its mobility and hydraulic functions to rotate the mixer attachment 43 to a horizontal position to scoop materials sliding on wear strips 4 from cutter edge to bottom of mixer (FIG. 2). The cutter edge supported by tub 3 to cutter edge support gussets into the mixing tub 39 and rotates back to a vertical position. The skid loader 1 then transfers hydraulic fluid from auxiliary hydraulic connectors through hydraulic hoses 28 (FIG. 5) to the hydraulic drive unit 29. The hydraulic drive unit 29 is attached to the mixing tub floor 37 with hydraulic drive unit fasteners 27 to rotate the auger center core 31 (FIG. 3) secured to each other by the auger shaft 26 retaining fastener (FIG. 5). When mixing, the mixer attachment 43 secured to the skid loader 1, positioned vertically and charged with hydraulic fluid, rotates the mixing auger fitting 30 attached to the auger center core 31. This pulls material from the center of the mixing tub floor 37, up the mixing auger fitting 30, around the auger center core 31 that is capped with the auger center core end cap 32, which pushes material from the top center of the mixing tub 39 to the outer edges contained by the mixing tub retaining rim 38.

Figure 6:
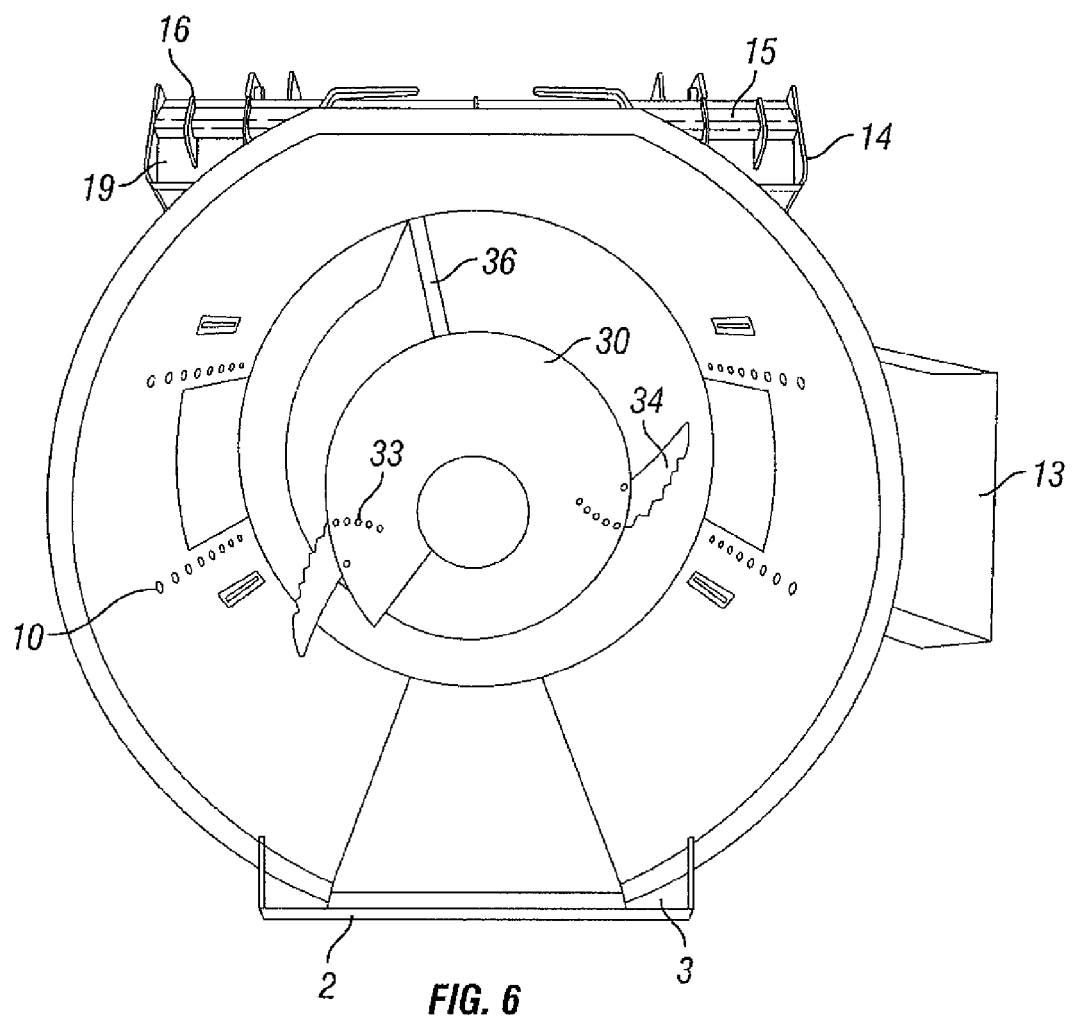
FIG. 6 is a top view of the example mixer attachment shown in FIG. 1A.
Figure 7:
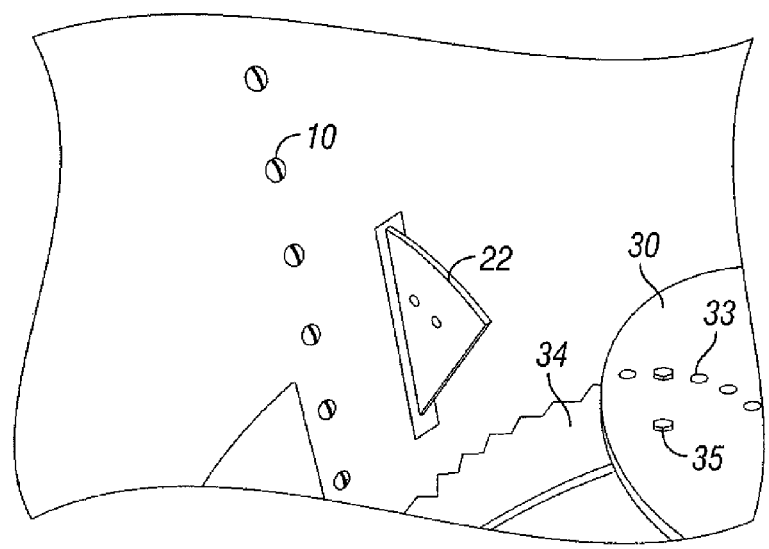
FIG. 7 is a detailed view of the blade adjustable material retarder protruding into the tank.
Figure 8:
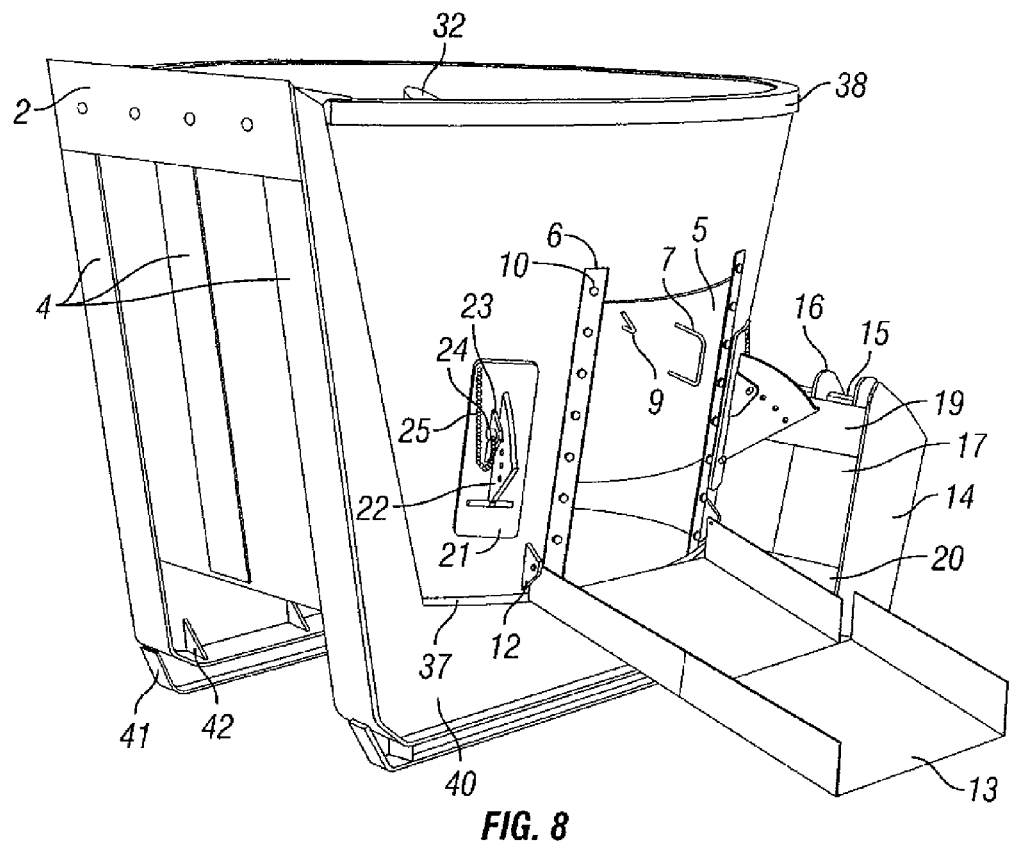
FIG. 8 is a detailed view of the chute in the extended position.
Figure 9A:
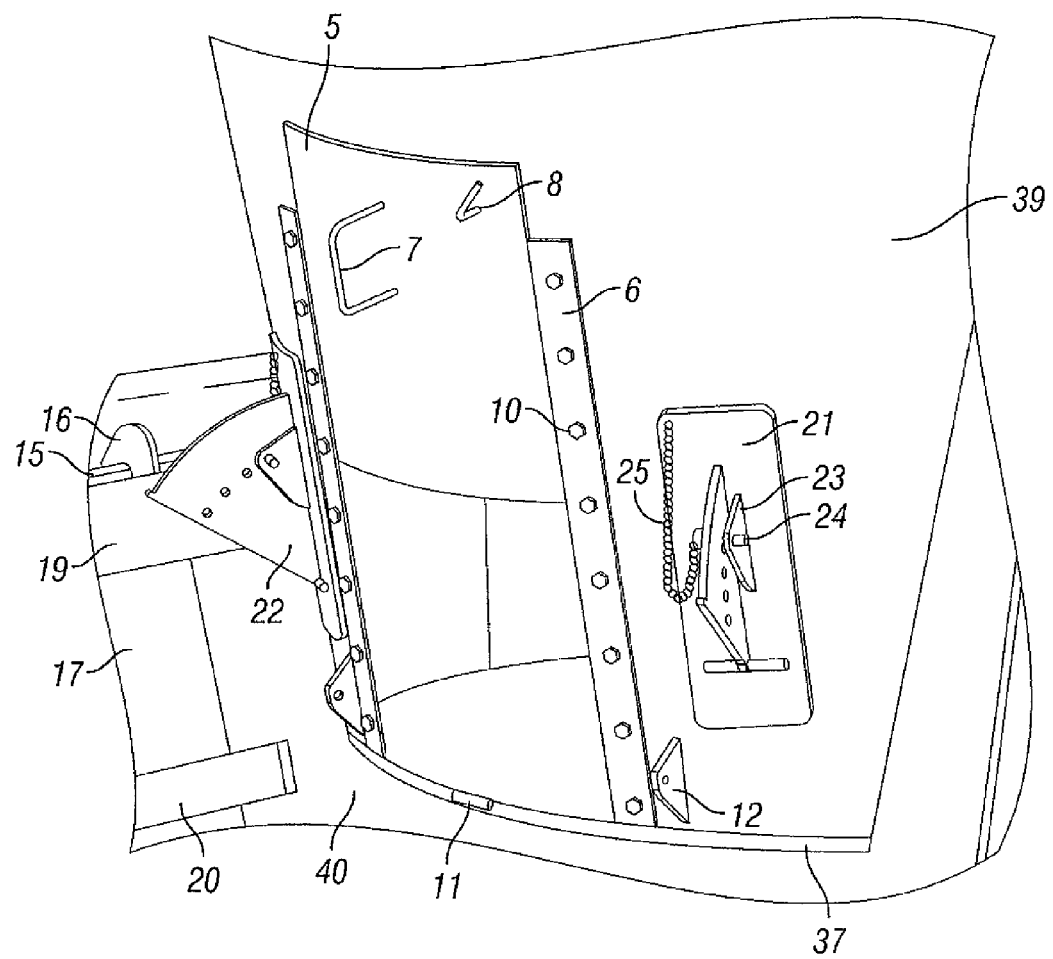
FIG. 9A is a detailed view of the side door in the open position.
Figure 9B:
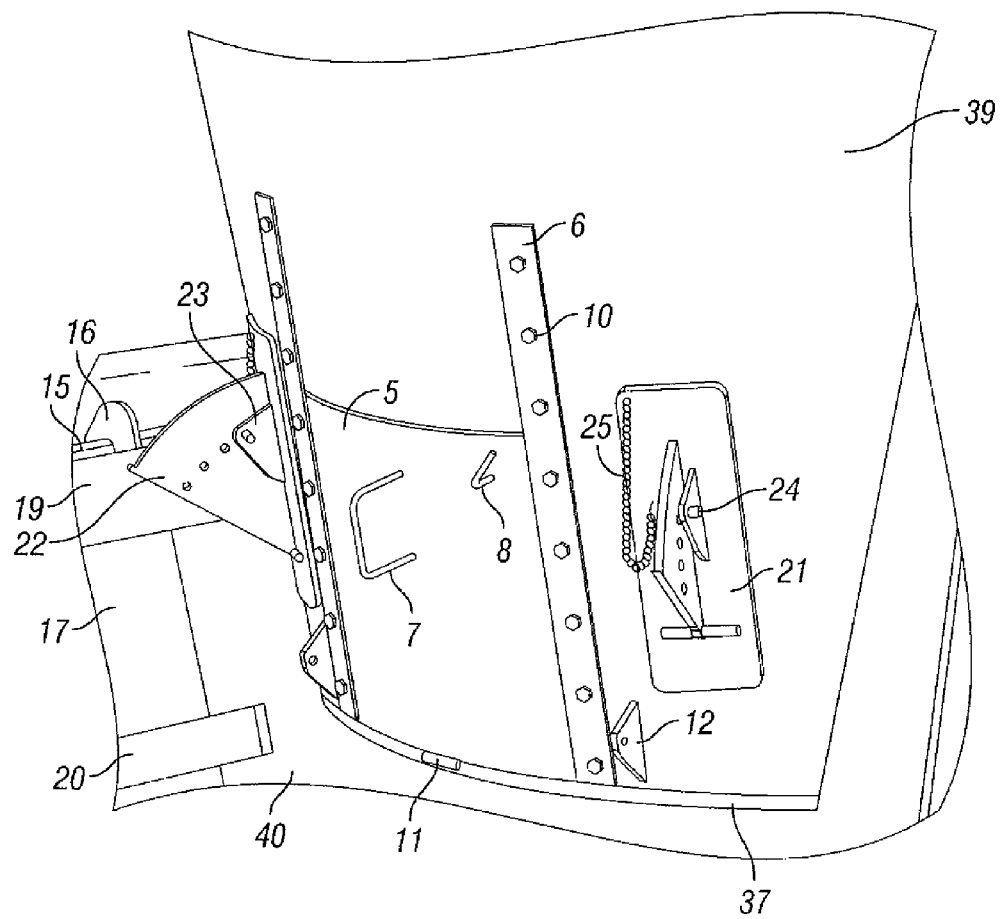
FIG. 9B is a detailed view of the side door in a closed position.

FIG. 6 shows the interior of the mixing tub 39. Material is drawn downward (top to bottom) along the interior of the mixing tub walls 39. As material is drawn downward (by fodder knives 34 attached to the mixing auger fitting 30 with fodder knife fasteners 35 in the fodder knife adjustment holes 33), it passes through downward flowing material, cutting fodder into the mixture. Raw feed materials vary greatly in moisture content, thus causing varied mixing difficulties. To adapt to these difficulties, adjustable material retarders 22 (FIG. 2) are attached to the outer surface of the mixing tub 39. The material retarder adjustment plate 21 has a material retarder adjustment locating bracket 23 and is attached to the mixing tub 39. The adjustable material retarder 22 is then pushed into the mixing tub 39 (FIG. 7) secured in a selected position by the material retarder adjustment pin 24 that is connected to the mixing tub 39 by a material retarder adjustment pin lanyard 25. When the adjustable material retarder 22 is positioned into the feed material, it allows the fodder knife 34 to pass through the feed material multiple times to cut fodder and control the mixing process. Once you achieve the desired mixture consistency, transport the mixer attachment 43 to the feeding area. Lower the material discharge chute 13 (FIG. 8) that is attached to the mixing tub 39 by chute attachment brackets 12 (FIGS. 9A and B).

Figure 10:
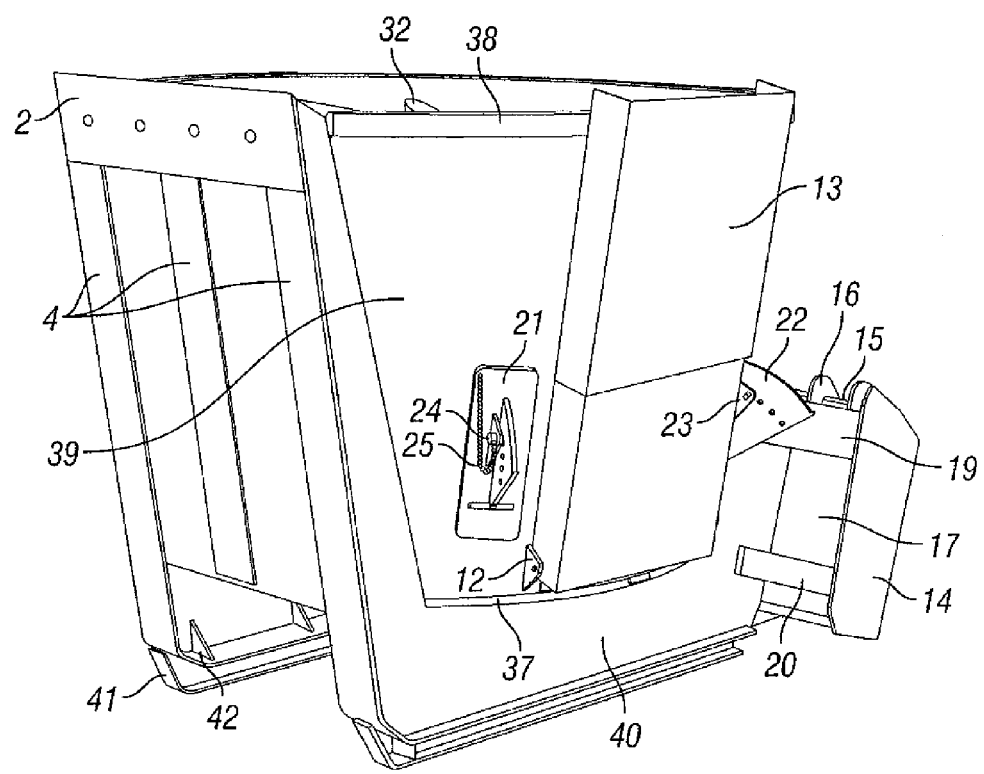
FIG. 10 is a detailed view of the chute in the retracted position.

The slide door 5 is contained and controlled at the bottom by the door stop 11 attached to the mixing tub floor 37. The slide door 5 rides in the door slide 6 attached to the mixing tub 39 by door slide fasteners 10 (FIGS. 9A and B). Pull upward on the slide door handle 7 to the proper opening and secure open position with the slide door position lock 8. The slide door 7 can also be opened with a lever attached to the door opening lever pivot 9. As the mixer attachment 43 is running and discharging the feed mixture down the discharge chute 13, the auger scraper 36 (FIG. 6) is ensuring that all the feed is discharged from the mixing tub floor 37. In FIG. 10, upon mixing completion and the mixing tub 39 is empty, the mixer attachment 43 can be disconnected vertically on base runners 41 secured to the mixer attachment 43 by base runners tub support frame gussets 42 to ensure a sturdy resting base for the mixer attachment 43.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A mixer attachment for use with a skid steer, the mixer attachment comprising:
   a mixing tub including a circumferential wall extending between a floor and a rim to define an interior compartment for holding a quantity of material, wherein at least a portion of the circumferential wall has a flat portion extending substantially between the floor to the rim;
   an auger extending into the interior compartment through the floor for mixing the material within the interior compartment, wherein the auger includes one or more knives for cutting the material in the interior compartment;

a hydraulic drive unit configured to rotate the auger, wherein the hydraulic drive unit is connectable to one or more hydraulic connections on the skid steer;

an attachment assembly configured to attach the mixing tub to the skid steer;

one or more material retarders extending into the interior compartment to impede movement of the material within the interior compartment;

a discharge chute movable between an open position that allows discharge of material from the interior compartment and a closed position that prevents discharge of the material within the interior compartment;

wherein the mixing tub is movable between a scooping position and a mixing position;

wherein the mixing tub is in an approximately horizontal position in the scooping position such that a leading edge of the flat portion is a scooping surface for directing material into the interior compartment of the mixing tub; and wherein the mixing tub is in an approximately vertical position in the mixing position such that rotation of the auger mixes material in the interior compartment of the mixing tub.

2. The mixer attachment of claim 1, further comprising a cutter edge adjacent the leading edge of the flat portion that is configured to direct material into the mixing tub when the mixing tub is in the scooping position.

3. The mixer attachment of claim 1, further comprising wear strips proximate the flat portion of the mixing tub, wherein the mixing tub substantially rides on the wear strips when in the scooping position.

4. The mixer attachment of claim 1, wherein the material retarders are movable between a first position and a second position, wherein the first position impedes movement of the material in the interior compartment more than the second position.

5. The mixer attachment of claim 1, wherein the auger is centrally located in the floor.

6. The mixer attachment of claim 5, wherein the auger is approximately concentric with the circumferential wall.

7. The mixer attachment of claim 1, further comprising an auger scraper proximate the floor extending from the auger to aid in expelling material through the discharge chute.

8. A mixer attachment for use with a skid steer, the mixer attachment comprising:

a mixing tub including an interior compartment for holding a quantity of material;

an auger disposed in the interior compartment for mixing the material;

a hydraulic drive unit configured to rotate the auger;

a discharge chute movable between an open position that allows discharge of material from the interior compartment of the mixing tub and a closed position that prevents discharge of the material within the interior compartment from the mixing tub; and wherein the mixing tub is movable between a scooping position in which at least a portion of the mixing tub is adapted to scoop material into the interior compartment from a pile of material on a surface and a mixing position in which rotation of the auger mixes the scooped material in the interior compartment.

9. The mixing attachment of claim 8, wherein the discharge chute is disposed on a circumferential wall of the mixing tub.

10. The mixing attachment of claim 9, wherein the discharge chute is positioned on the circumferential wall to allow gravity feed of the material from the interior compartment when the auger rotates.

11. The mixing attachment of claim 8, wherein the auger includes a helical blade.

12. The mixing attachment of claim 11, further comprising one or more fodder knives extending from the helical blade to cut the material.

13. The mixing attachment of claim 8, further comprising a door on the mixing tub that slides between an open position that allows material to be discharged from the interior compartment and a closed position.

14. The mixing attachment of claim 8, further comprising one or more material retarders extending into the interior compartment to impede movement of the material within the interior compartment.

15. The mixing attachment of claim 14, wherein the material retarders are movable between a first position and a second position, wherein the first position impedes movement of the material in the interior compartment more than the second position.

16. A mixer attachment for use with a skid steer, the mixer attachment comprising:

a mixing tub including a circumferential wall extending between a floor and a rim to define an interior compartment for holding a quantity of material, wherein at least a portion of the circumferential wall has a flat portion extending substantially between the floor to the rim;

one or more wear strips proximate the flat portion of the mixing tub;

an auger extending into the interior compartment through the floor for mixing the material within the interior compartment, wherein the auger is centrally located in the floor, wherein the auger includes one or more knives for cutting the material in the interior compartment;

a hydraulic drive unit configured to rotate the auger, wherein the hydraulic drive unit is connectable to one or more hydraulic connections on the skid steer;

an attachment assembly configured to attach the mixing tub to the skid steer;

one or more material retarders extending into the interior compartment to impede movement of the material within the interior compartment, wherein the material retarders are movable between a first position and a second position, wherein the first position impedes movement of the material in the interior compartment more than the second position;

a discharge chute movable between an open position that allows discharge of material from the interior compartment and a closed position that prevents discharge of the material within the interior compartment;

wherein the mixing tub is movable between a scooping position and a mixing position;

wherein the mixing tub is in an approximately horizontal position in the scooping position such that a leading edge of the flat portion is a scooping surface for directing material into the interior compartment of the mixing tub, wherein the mixing tub substantially rides on the wear strips when in the scooping position; and wherein the mixing tub is in an approximately vertical position in the mixing position such that rotation of the auger mixes material in the interior compartment of the mixing tub.

* * * * *